(12) United States Patent
Balakrishnan et al.

(10) Patent No.: US 8,112,051 B2
(45) Date of Patent: Feb. 7, 2012

(54) METHOD AND SYSTEM FOR FALSE FREQUENCY LOCK FREE AUTONOMOUS SCAN IN A RECEIVER

(75) Inventors: Jaiganesh Balakrishnan, Bangalore (IN); Aravind Ganesan, Bangalore (IN); Sriram Murali, Bangalore (IN); Bijoy Bhukania, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 265 days.

(21) Appl. No.: 12/616,260

(22) Filed: Nov. 11, 2009

(65) Prior Publication Data

US 2011/0111714 A1 May 12, 2011

(30) Foreign Application Priority Data

Nov. 11, 2008 (IN) .......................... 2764/CHE/2008

(51) Int. Cl.
*H04B 1/18* (2006.01)
*H04B 1/16* (2006.01)

(52) U.S. Cl. ..................... 455/161.3; 455/205; 455/214; 455/222; 455/226.2; 455/226.3

(58) Field of Classification Search ............... 455/161.3, 455/205, 214, 222, 226.2, 226.3, 130, 160.1, 455/164.1, 206, 207, 226.1, 228, 230, 278.1, 455/295, 296, 311, 312, 336, 337; 324/633, 324/76.52, 76.53; 327/147, 156, 158, 159; 331/16, 11, 14

See application file for complete search history.

(56) References Cited

U.S. PATENT DOCUMENTS

| 6,031,428 | A  | * | 2/2000  | Hill ................................. | 331/11  |
| 6,324,228 | B1 | * | 11/2001 | Millward et al. ............. | 375/344 |
| 6,801,092 | B1 | * | 10/2004 | Moloudi ......................... | 331/16  |
| 7,501,865 | B1 | * | 3/2009  | Jacobowitz et al. .......... | 327/147 |
| 7,932,732 | B2 | * | 4/2011  | Ellis et al. ...................... | 324/633 |
| 2005/0024154 | A1 | * | 2/2005 | Moloudi ......................... | 331/16  |
| 2009/0224837 | A1 | * | 9/2009 | Joy et al. ........................ | 331/15  |

* cited by examiner

*Primary Examiner* — Pablo Tran
(74) *Attorney, Agent, or Firm* — Wade J. Brady, III; Frederick J. Telecky, Jr.

(57) ABSTRACT

Method and system for false lock free autonomous scan in a receiver is disclosed. The method includes identifying a presence of a desired signal to avoid false frequency lock in a Frequency Modulation receiver. The method includes receiving a signal. The method further includes identifying the desired signal, if a first energy is above a first threshold. The method also includes identifying the desired signal, if an Intermediate Frequency count is below a second threshold. The method includes identifying the desired signal, if a second energy of the signal is above a third threshold. The method includes identifying the desired signal, if an absolute difference between a first Received Signal Strength Indication (RSSI) value and a second RSSI value of the signal is below a fourth threshold. The method includes determining a third energy. The method includes identifying the desired signal, if the third energy is below a fifth threshold.

20 Claims, 8 Drawing Sheets

METHOD AND SYSTEM FOR FALSE FREQUENCY LOCK FREE AUTONOMOUS SCAN IN A RECEIVER

REFERENCE TO PRIORITY APPLICATION

This application claims priority from Indian Provisional Application Serial No. 2764/CHE/2008 filed on Nov. 11, 2008, entitled "False Lock Free Autonomous Scan in FM Receivers", which is incorporated herein by reference in its entirety.

TECHNICAL FIELD

Embodiments of the disclosure relate to Frequency Modulation (FM) receivers.

BACKGROUND

A Frequency Modulation (FM) receiver receives FM signals from an FM broadcasting station. Currently, to automatically scan a valid transmission, the FM receiver finds FM broadcasting stations with valid transmissions or frequency locks to a next FM broadcasting station having a valid transmission. Due to interference from other radio circuits, or due to non-linear analog front end of the FM receiver, a condition called false frequency lock can occur in the FM receiver. The false frequency lock can lead to a noisy output as the FM receiver locks to a frequency signal other than a desired signal or a valid signal. Therefore, there is a need for an FM receiver that avoids false frequency locks during autonomous scan.

In an existing technique to avoid false frequency locks, two metrics are used to determine if a frequency signal corresponds to the valid signal. First metric is Received Signal Strength Indication (RSSI). The RSSI indicates energy of an FM signal. If the RSSI is greater than a threshold, then an FM channel is found to have a valid transmission. The threshold is based on sensitivity. Second metric is Intermediate Frequency (IF) count. The IF count indicates nominal centre frequency of the FM signal. Ideally, the IF count has a value of zero. If the IF count is lesser than an expected mismatch between an FM transmitter and the FM receiver, the FM channel is found to have a valid transmission. However, when interferences from other radio circuits fall in a frequency channel of interest, the metrics fail to prevent false frequency lock. Also, the false frequency lock can occur when harmonics of signals at other frequencies fall in a frequency channel of interest. Further, the false frequency lock may also occur when two signals of similar strength from two valid stations are centered at either end of the frequency channel of interest.

SUMMARY

An example of a method for identifying a presence of a desired signal to avoid false frequency lock in a Frequency Modulation (FM) receiver includes receiving a signal. The method also includes determining a first energy of the signal, the first energy being the strength of the signal. The method further includes identifying the presence of the desired signal, if the first energy is above a first threshold. The method includes determining an Intermediate Frequency (IF) count of the signal. The method also includes identifying the presence of the desired signal, if the IF count is below a second threshold. Further, the method includes determining a second energy. In addition, the method includes identifying the presence of the desired signal, if the second energy of the signal is above a third threshold. Moreover, the method includes identifying the presence of the desired signal, if an absolute difference between a first Received Signal Strength Indication (RSSI) value and a second RSSI value of the signal is below a fourth threshold. Furthermore, the method includes determining a third energy, the third energy being an energy of noise in the signal. The method includes identifying the presence of the desired signal, if the third energy is below a fifth threshold.

An example of a system for identifying a presence of a desired signal to avoid false frequency lock in a Frequency Modulation (FM) receiver includes a Received Signal Strength Indication (RSSI) computation unit to identify the presence of the desired signal, if a first energy of a signal, received by the FM receiver, is above a first threshold. The system also includes an Intermediate Frequency (IF) count unit to identify the presence of the desired signal, if the IF count of the signal is below a second threshold. Further, the system includes a spur detector to identify the presence of the desired signal, if a second energy of the signal is above a third threshold. The system also includes a compression detector to identify the presence of the desired signal, if an absolute difference between a first RSSI value and a second RSSI value of the signal is below a fourth threshold. Furthermore, the system includes a noise detector to identify the presence of the desired signal, if a third energy of noise in the demodulated signal is below a fifth threshold.

An example of a system for identifying a presence of a desired signal to avoid false frequency lock in a Frequency Modulation (FM) receiver includes a Received Signal Strength Indication (RSSI) computation unit to identify the presence of the desired signal, if a first energy of a signal, received by the FM receiver, is above a first threshold. The system also includes an Intermediate Frequency (IF) count unit to identify the presence of the desired signal, if the IF count of the signal is below a second threshold. The system also includes a spur detector to identify a spur-free signal, if a second energy of a signal is above a third threshold, wherein the spur detector comprises an auto-correlator to perform an auto-correlation of the signal to determine the second energy of the signal. Further, the system includes a compression detector to determine undesired harmonic components in the signal and identify the presence of the desired signal, if an absolute difference between a first Received Signal Strength Indication (RSSI) value and a second RSSI value of the signal is below a fourth threshold. In addition, the system includes a noise detector to identify a noise-free FM signal, if a third energy of noise in the signal is below a fifth threshold, wherein the noise detector includes a signal multiplier operable to multiply demodulated signal and a signal, a noise band filter coupled to the signal multiplier, and a noise measurement unit coupled to the noise band filter. The noise measurement unit measures the third energy of the noise of the demodulated signal in a frequency range of: 15 KHz to 23 KHz.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the disclosure.

DETAILED DESCRIPTION OF THE EMBODIMENTS

Figure 1:
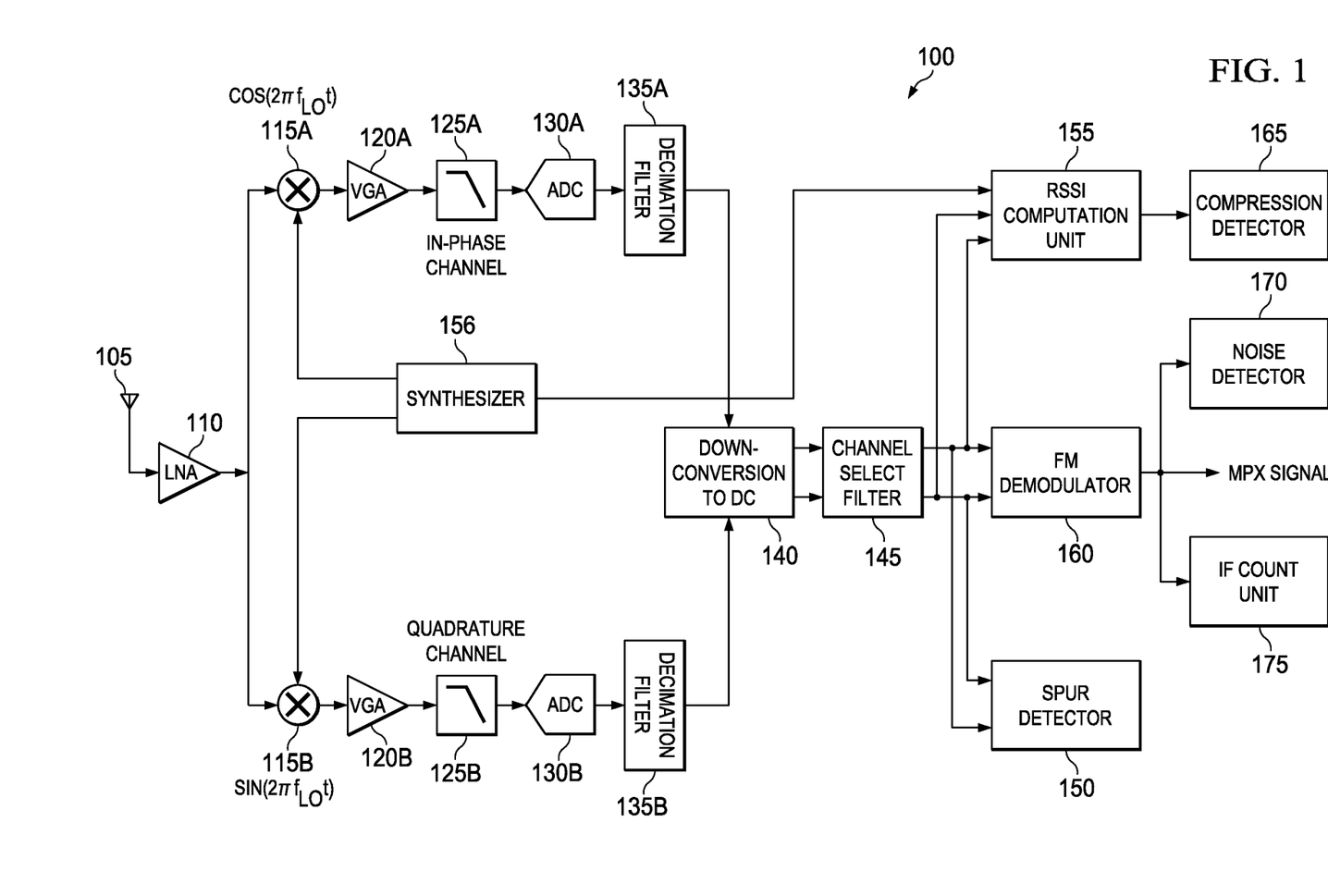
FIG. 1 illustrates a system in a Frequency Modulation (FM) receiver in accordance with one embodiment.

FIG. 1 illustrates a system 100 for identifying a presence of a desired signal to avoid false frequency lock in a receiver, hereinafter referred to as a Frequency Modulation (FM) receiver. The desired signal may be a signal present in a valid FM channel. The signal may be an FM signal. In one embodiment, the FM receiver is designed to receive FM signals in a frequency range: 87.5 Mega Hertz (MHz) to 108 MHz. In another embodiment, the FM receiver is designed to receive FM signals in a frequency range: 76 MHz to 90 MHz. The received FM signals correspond to FM signals transmitted by broadcasting stations occupying bandwidths of 200 Kilo Hertz (KHz) within the frequency range. In one embodiment, an FM channel of a broadcasting station is centered at a multiple of 50 KHz and is separated from an FM channel of another broadcasting station by at least 200 KHz.

The system 100 provides an autonomous scan mode. In one embodiment, when the autonomous scan mode is enabled, the system 100 provides a list of all valid broadcasting stations in the frequency range. In another embodiment, a frequency is specified and the system 100 locks to a first FM channel of a valid broadcasting station located after the specified frequency in the frequency range. Examples of systems utilizing the system 100 include, but are not limited to, a mobile phone, a digital audio player, a portable electronic device supporting the FM receiver, and a car stereo.

The system 100 includes an antenna 105 to receive an FM signal. Examples of the antenna 105 include, but are not limited to, a dipole antenna, an embedded antenna, and a vertically polarized antenna. The system 100 also includes a Low Noise Amplifier (LNA) 110 coupled to the antenna 105 for amplifying the FM signal.

The LNA 110 is coupled to a mixer 115A. The mixer 115A is coupled in series configuration to an amplifier 120A, an anti-alias filter 125A, an Analog-to-Digital Converter (ADC) 130A, and a filter 135A to form in-phase channel of the system 100. An example of the filter 135A may include, but not limited to, a decimation filter. Further, the LNA 110 is coupled to a mixer 115B. The mixer 115B is coupled in series configuration to an amplifier 120B, an anti-alias filter 125B, an ADC 130B, and a filter 135B to form quadrature channel of the system 100. An example of the filter 135B may include, but not limited to, a decimation filter.

The mixer 115A performs mixing operation of the amplified FM signal with a local oscillator (LO) signal, for example a cos $(2\pi f_{LO}t)$ signal, to down convert the FM signal to an Intermediate Frequency (IF) signal. The mixer 115A is coupled to an amplifier 120A to amplify the IF signal. An example of the amplifier 120A is a Variable Gain Amplifier (VGA). The VGA may be a device having a control input that can vary the gain of the device. The amplifier 120A is coupled to the anti-alias filter 125A. The ADC 130A coupled to the anti-alias filter 125A converts the analog signal from the anti-alias filter 125A to digital samples. The anti-alias filter 125A filters out the out-of-band signals prior to sampling with the ADC 130A. The ADC 130A is further coupled to the filter 135A. The filter 135A reduces the sampling rate and filters noise in the digital samples.

The mixer 115B mixes the amplified signal obtained from the LNA 110 with a LO signal. The LO signal is at phase quadrature with the LO corresponding to the mixer 115A. For example the mixer 115B uses a $\sin(2\pi f_{LO}t)$ signal when the LO associated with the mixer 115A is the cos $(2\pi f_{LO}t)$ signal. The mixer 115B is coupled to the amplifier 120B to amplify the IF signal. An example of the amplifier 120B is a VGA. The amplifier 120B is coupled to the anti-alias filter 125B. The ADC 130B coupled to the anti-alias filter 125B converts the analog signal from the anti-alias filter 125B to digital samples. The anti-alias filter 125B filters out the out-of-band signals prior to sampling with the ADC 130B. The ADC 130B is further coupled to the filter 135B. The filter 135B reduces the sampling rate and filters noise in the digital samples.

The system 100 includes a component 140 that performs a mixing operation to down convert the IF signal from either a Fif or a −Fif to Direct Current (zero frequency), the Fif being the Intermediate Frequency. The FM receiver also includes a channel select filter 145 to selectively pass desired signal. The FM receiver includes a spur detector 150, a Received Signal Strength Indication (RSSI) computation unit 155, and an FM demodulator 160 coupled to the channel select filter 145.

The RSSI computation unit 155 determines a first energy of the FM signal. The first energy of the FM signal is a RSSI of the signal. The RSSI computation unit 155 compares the first energy of the signal with a first threshold. The RSSI computation unit 155 identifies presence of the desired signal if the first energy is above the first threshold. The first threshold may be selected based on sensitivity of the FM receiver.

The spur detector 150 identifies presence of the desired signal, if a second energy of the FM signal is above a third threshold. The third threshold may be a predetermined value. In one embodiment, the third threshold may be programmed. The presence of the desired signal identified by the spur detector 150 is a spur-free signal. The spur-free signal may be free of interference. The spur detector 150 includes an auto-correlator to perform an auto-correlation of the signal.

The RSSI computation unit 155 is coupled to a compression detector 165. The compression detector 165 identifies the presence of the desired signal, if an absolute difference between a first RSSI value and a second RSSI value of the signal is below a fourth threshold. The RSSI computation unit 155 generates the first RSSI value and the second RSSI value of the signal. The presence of the desired signal identified by the compression detector 165 is free of undesired harmonic components. The undesired harmonic components may be harmonics of interferences that exist within the FM channel due to the FM signal compression. The compression detector 165 tunes a synthesizer 156 to two different frequency to obtain the first RSSI value and the second RSSI value.

The FM demodulator 160 demodulates the FM signal. The demodulated FM signal comprises an FM multiplex (MPX) signal. The FM MPX signal is a signal transmitted by a broadcasting station. In one example, the FM MPX signal includes a mono component centered at 0 KHz, a pilot carrier at 19 KHz, a stereo component at 38 KHz, and radio data sensitivity (RDS) component at 57 KHz. The mono component is used by receivers with a single audio output, and the stereo component is used by stereo receivers with Left and Right audio outputs. The mono component may also be used by receivers with Left and Right audio outputs in case a signal-to-noise ratio (SNR) of the FM MPX signal is low, as the stereo receivers are dependent on reception quality. The pilot carrier is used to coherently demodulate the stereo component at the receiver. The RDS component provides digital information, for example information on the broadcasting station, artist's name, and song name, to the system 100.

Furthermore, the system 100 includes a noise detector 170 and an IF count unit 175 coupled to the FM demodulator 160. The noise detector 170 identifies the presence of the desired signal, if a third energy is below a fifth threshold. The third energy of the signal is energy of noise in the signal. The presence of the desired signal identified by the noise detector 170 is a noise-free signal. In some instances, environment noise may be high. The RSSI of the FM signal passes the first threshold as determined by the RSSI computation unit 155. However, the noise detector 170 determines the presence of noise. The noise detector 170 uses the FM MPX signal to estimate level of noise at the input of the FM demodulator.

The noise detector 170 includes a signal multiplier operable to multiply the demodulated FM signal and another signal. The another signal is at least one of a predetermined frequency, and a demodulated pilot signal. In one example, the predetermined frequency is: 19 KHz.

In one embodiment, the noise detector 170 includes a noise band filter coupled to the signal multiplier. The noise band filter includes a plurality of filters coupled to the signal multiplier. Examples of the plurality of filters include, but are not limited to, a Finite Impulse Response filter, and decimation filter. Further, the noise detector 170 includes a noise measurement unit coupled to the noise band filter. Examples of the noise measurement unit include, but are not limited to, an energy accumulator, a mean absolute value computation unit and an envelope detector.

In another embodiment, the noise detector 170 includes a band pass filter, and the noise measurement unit coupled to the band pass filter.

The IF count unit 175 determines a nominal centre frequency of the signal, the nominal centre frequency is the IF count. The IF count unit 175 identifies the presence of the desired signal, if the IF count is below a second threshold. According to an example, the second threshold is a value $\Delta f$. The value $\Delta f$ may be selected based on maximum expected mismatch between frequencies of transmitter at the broadcasting station and the system 100.

For example, consider a maximum expected mismatch between frequencies of transmitter and the system 100 as $\pm 200$ ppm. For an FM channel centered at 108 MHz, the maximum expected mismatch may be $108 \text{ MHz} \times 200 \times 10^{-6}$, i.e., 21.6 KHz. The value $\Delta f$ is thus chosen to be greater than 21.6 KHz.

In a preferred embodiment, the system 100 declares a lock to an FM channel during autonomous scan mode based on outputs of at least one of the spur detector 150, the RSSI computation unit 155, the noise detector 160, and the IF count unit 175.

The FM receiver includes an autonomous mode scan state machine to cause the FM receiver to avoid locking based on outputs of at least one of the spur detector 150, the compression detector 165 and the noise detector 160.

Figure 2A:
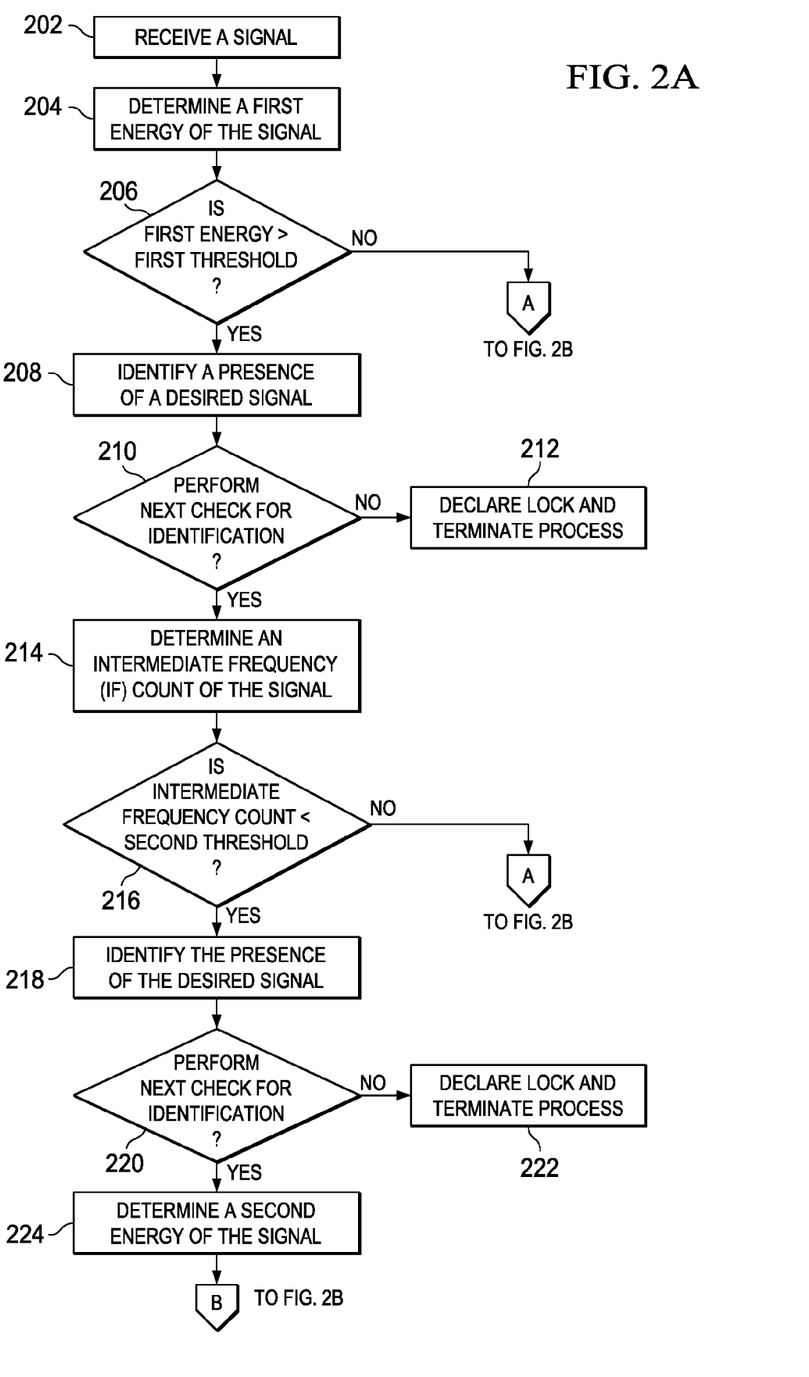
FIG. 2A and FIG. 2B illustrate a method for identifying a presence of a desired signal in the FM receiver in accordance with one embodiment.
Figure 2B:
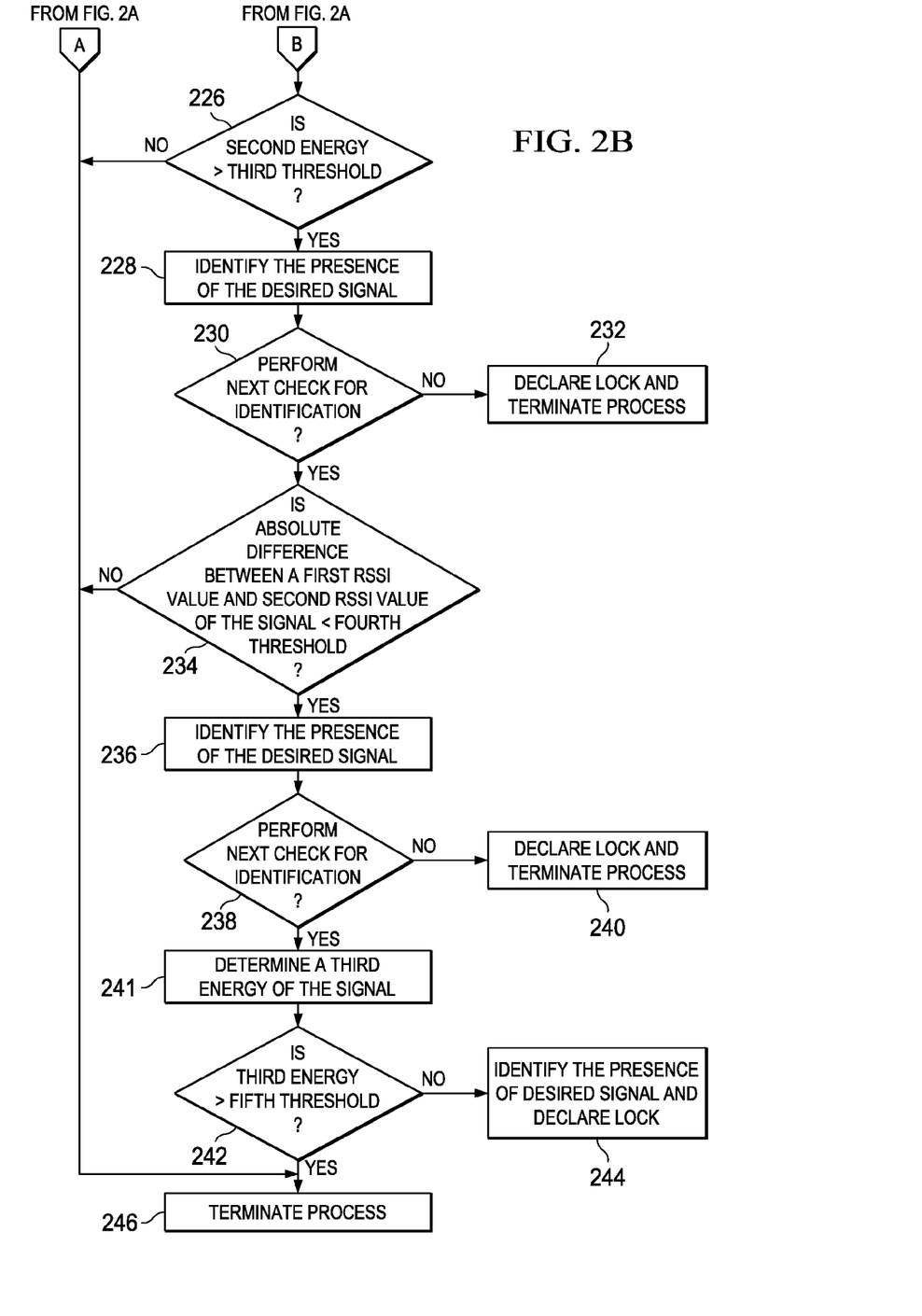

FIG. 2A and FIG. 2B illustrate a method for identifying a presence of a desired signal in the FM receiver.

At step 202, a signal is received by the FM receiver. The signal may be the FM signal. The signal may be received by a portable device, for example a mobile phone or an electronic device supporting any FM receiver. The signal may be received by the FM receiver during an autonomous scan mode. For example, the FM signal is received when a user of a mobile phone intends to scan the available FM channels in the frequency range of the mobile phone.

At step 204, a first energy of the signal is determined, the first energy being the strength of the signal. The first energy may be estimated by the RSSI computation unit 155.

At step 206, a check is performed to determine if the first energy is above a first threshold ($\alpha_{sig}$). The first threshold ($\alpha_{sig}$) may be selected based on sensitivity. If the first energy is above the first threshold ($\alpha_{sig}$) then step 208 is performed, else step 246 is performed.

At step 208, the presence of the desired signal is identified.

At step 210, a check is performed by the system 100 to determine if a next method for identification of the presence of the desired signal is necessary. If the next method for identification is not necessary, step 212 is performed, else step 214 is performed.

At step 212, the desired signal is locked and the process of scanning the desired signal is terminated. For example, the desired signal may be a valid FM channel. The user of the mobile phone can lock to the FM channel and save the FM channel in the mobile phone.

At step 214, an Intermediate Frequency (IF) count is determined. In one embodiment, the Intermediate Frequency count unit 175 may determine the presence of the desired signal.

At step 216, a check is performed by the system 100 to determine if the IF count is below the second threshold. If the IF count is below the second threshold then step 218 is performed else step 246 is performed. The second threshold may be the value $\Delta f$. The value $\Delta f$ may be selected based on maximum expected mismatch between frequencies of transmitter at the broadcasting station and the system 100.

At step 218, the presence of the desired signal is identified.

At step 220, a check is performed by the system 100 to determine if a next method for identification of the presence of the desired signal is necessary. If the next method for identification is not necessary, step 222 is performed else step 224 is performed.

At step 222, the desired signal is locked and the process of scanning for the presence of the desired signals is terminated.

At step 224, the second energy of the signal is determined by the spur detector 150 of the system 100. The second energy is a spur-free energy of the signal. In one embodiment, to determine the second energy of the signal, a first auto-correlation of the signal is performed by the spur detector 150 at zero time-lag to obtain a first auto-correlated signal. A second auto-correlation of the signal is performed by the spur detector 150 at high time-lag to obtain an absolute value of second auto-correlated signal. A difference between the first auto-correlated signal and the absolute value of the second auto-correlated signal is determined by the spur detector 150 to obtain a spur-free power of the signal. The logarithm of the spur-free power is determined by the spur detector 150 to obtain the second energy of the signal.

In another embodiment, a correction factor is determined by the spur detector 150 based on the first auto-correlated signal and the absolute value of the second auto-correlated signal. The correction factor is summed with the difference by the spur detector 150 to obtain a spur-free power of the signal. The logarithm of the spur-free power is determined by the spur detector 150 to obtain the spur-free energy of the signal in the dB domain.

At step 226, a check is performed by the system 100 to determine if the second energy of the signal is greater than the third threshold. The third threshold may be predetermined value. In one embodiment, the third threshold may be programmed value.

If the second energy of the signal is greater than the third threshold, step 228 is performed else step 246 is performed.

At step 228, the presence of the desired signal is identified by the system 100. The presence of the desired signal identified at step 220 is a spur-free signal.

At step 230, a check is performed by the system 100 to determine if a next method for identification of the presence of the desired signal is necessary. If the next method for identification is not necessary, step 232 is performed, else step 234 is performed.

At step 232, the desired signal is locked and the process of scanning for the presence of the desired signals is terminated.

At step 234, a check is performed by the system 100 to determine if an absolute difference between the first RSSI value and the second RSSI value of the signal is lesser than the fourth threshold. The fourth threshold may be predetermined value. In one embodiment, the fourth threshold may be programmed value. If the absolute difference is lesser than the fourth threshold, step 236 is performed else step 246 is performed. When the absolute difference is lesser than the fourth threshold, no compression is detected in the signal in the analog front-end of the FM receiver. The absolute difference is obtained by the compression detector 165.

To determine the first RSSI value, down conversion of the signal to an IF signal is performed by mixing operation of the signal and a second signal, the second signal may be the LO signal corresponding to a mixer. The mixer may be within the system 100 or coupled to the system 100 externally. The second signal is at a first frequency different from the center frequency of the signal. In one embodiment, the first frequency is lesser than the center frequency of the signal. The RSSI of the IF signal is then measured by the RSSI computation unit 155 to obtain the first RSSI value.

To determine the second RSSI value, down conversion of the signal to an IF signal is performed by mixing operation of the signal and a third signal. The third signal may be the LO signal corresponding to the mixer. The third signal is a second frequency different from the center frequency of the signal. In one embodiment, the third signal may be at a frequency greater than center frequency of the signal. The RSSI of the IF signal is then measured by the RSSI computation unit 155 to obtain the second RSSI value.

At step 236, the presence of the desired signal is identified by the system 100. The presence of the desired signal identified at step 236 is a signal free from undesired harmonic components in the signal generated due to compression in the analog front end of the FM receiver.

At step 238, a check is performed by the system 100 to determine if a next method for identification of the presence of the desired signal is necessary. If the next method for identification is not necessary, step 240 is performed, else step 241 is performed.

At step 240, the desired signal is locked and the process of scanning for the presence of the desired signals is terminated.

At step 241, a third energy is determined. The third energy is determined by the noise detector 170. The third energy is the energy of noise present in the signal. The signal is demodulated by the system 100. The third energy of the noise is measured by the noise detector 170 in a predetermined range of the signal. In one embodiment, the predetermined range is 15 KHz to 23 KHz. The predetermined range includes noise and a pilot component.

At step 242, a check is performed by the system 100 to determine if the third energy of noise in the signal is greater than the fifth threshold. The fifth threshold may be selected based on an acceptable quality of the demodulated signal.

The fifth threshold may be predetermined. In one embodiment, the fifth threshold may be programmed. If the third energy of the noise is greater than the fifth threshold, step 246 is performed else step 244 is performed.

At step 244, the presence of the desired signal is identified by the system 100. The presence of the desired signal identified at step 244 is a noise-free signal. The noise-free signal has a noise level that is below a maximum acceptable level. Further, the lock is declared.

At step 246, the process of scanning for the presence of the desired signals is terminated.

In some embodiments, the presence of the desired signal may be identified by any one of the compression detector 165, the noise detector 170, spur detector 150, the RSSI computation unit 155, and the IF count 160.

It is to be noted that the steps from 202 to the step 246 need not be performed in the same sequence.

Figure 3:
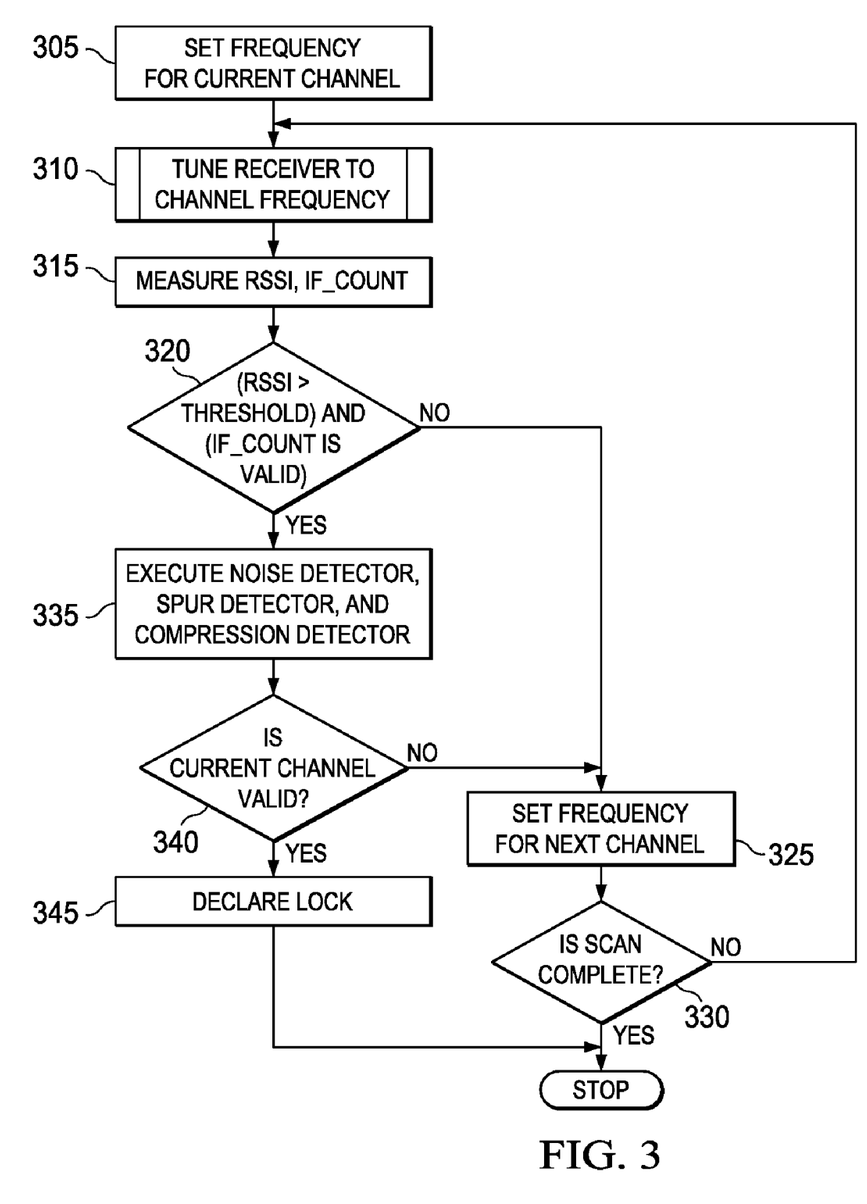
FIG. 3 illustrates a method for false frequency lock free autonomous scan in accordance with one embodiment.

FIG. 3 illustrates a flow diagram for false frequency lock free autonomous scan.

At step 305, a user sets a frequency for a current channel in the portable device employing the FM receiver. The frequency may be the desired FM signal. For example, the user sets a frequency of 87.5 MHz. The current channel is a frequency channel. In another embodiment, at step 305, autonomous scan mode sets a frequency for the current channel in the portable device.

At step 310, the system 100 is tuned to receive the frequency of the current channel. The tuning involves changing operating frequency of local oscillator signals supplied to mixers in the FM receiver.

At step 315, the RSSI and the IF count of the frequency are measured by the RSSI computation unit 155 and the IF count unit 175.

At step 320, a check is performed by the system 100 to determine if the RSSI is lesser than the first threshold or the IF count is greater than the second threshold. If the RSSI is greater than the first threshold or the IF count is lesser than the second threshold then step 335 is performed, else step 325 is performed.

At step 325, the autonomous scan mode sets another frequency corresponding to next channel.

At step 330, a check is performed by the system 100 to determine if the autonomous scan is complete. If the autonomous scan is not complete, then step 310 is performed. If the autonomous scan is complete, the process is terminated.

At step 335, spur detection, noise measurement, and compression detection are performed by the system 100. The spur detector 150 identifies presence of spurs in the signal, compression detector 165 identifies presence of unwanted harmonic components in the signal due to compression in the analog front end of the receiver, and the noise detector 170 identifies presence of noise in the signal.

At step 340, the frequency is determined to be valid or invalid, based on the detection and the measurement.

At step 345, the presence of the desired signal is identified.

Figure 4:
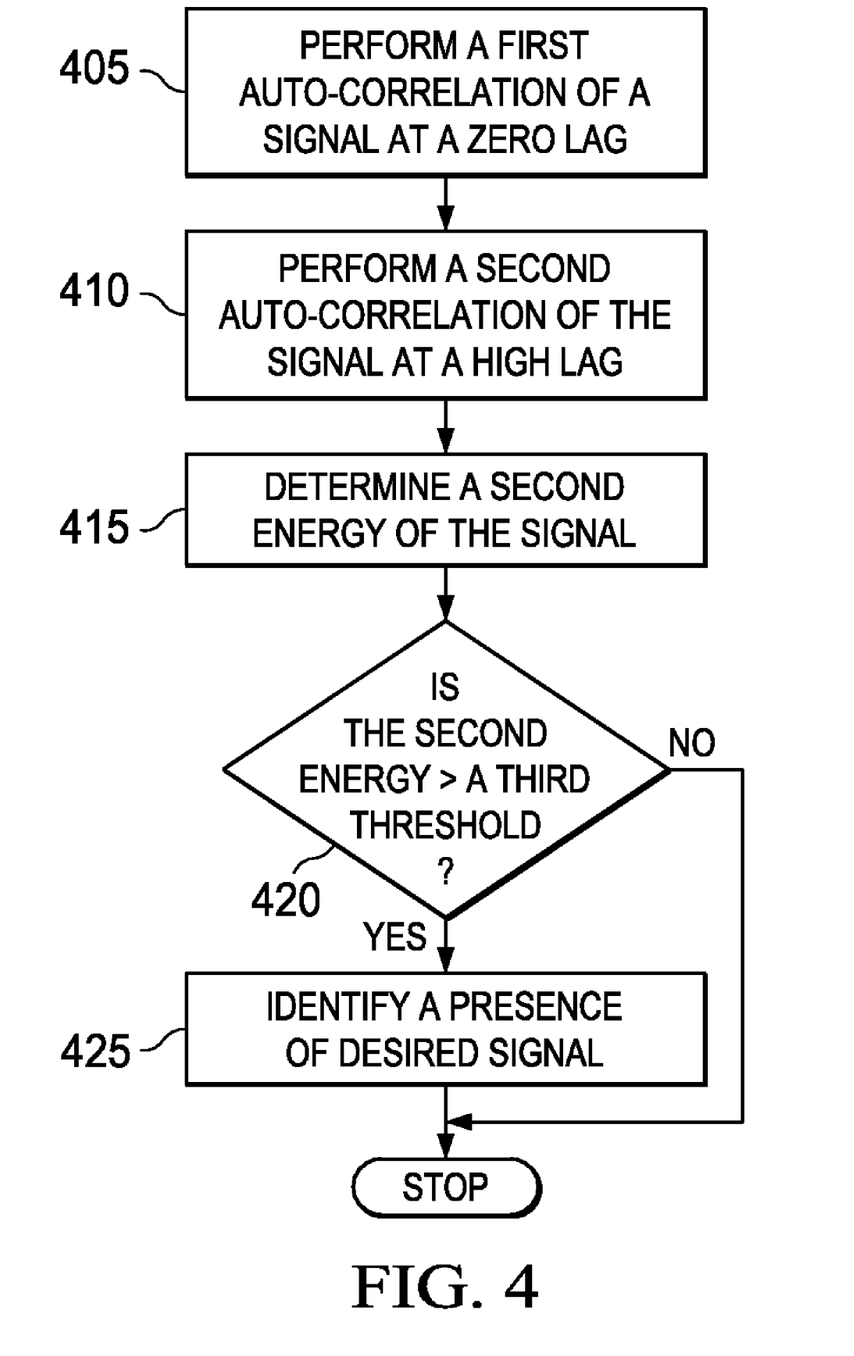
FIG. 4 illustrates a method for spur detection in an FM channel in accordance with one embodiment.

FIG. 4 illustrates a method for spur detection in an FM channel. The spurs in the FM channel may arise from other digital circuits integrated with the FM receiver in a System on Chip (SoC). The spurs may also arise from digital activity within the FM receiver. For example, the spurs may arise from harmonics of a clock within the FM receiver. The spurs may be a single tone signal or a multi tone signal. The spurs can trigger a false frequency lock if energy estimation in the band of frequencies includes signal energy and spur energy. The spurs can also trigger a false frequency lock when the IF count is lesser than the value Δf.

The spur detector 150 estimates the second energy of the signal, without including energy of the spurs. The signal may be the FM signal. The signal may be received by a portable device, for example a mobile phone or an FM receiver supporting any electronic device. The signal may be received by the FM receiver during the autonomous scan mode.

The spur detector 150 prevents a false lock in a situation when the spur energy is greater than the signal energy. For example, if the spur-free signal energy is −90 decibel (dBm) and the spur energy is −80 dBm, the spur detector 150 gives the spur-free signal energy estimate as −90 dBm. Difference between total signal energy and the spur energy is used for detecting presence of a spur.

The spur detector 150 includes an auto-correlator operable to perform auto-correlation of the signal.

At step 405, a first auto-correlation of a signal is performed at a zero lag.

The spur detector 150 calculates autocorrelation R(m) of the signal using equation (1). Where, x(k) is sum of the FM signal S(k) and the spur I(k), as given in equation (2).

$$R(m) = \frac{1}{N} \sum_{k=0}^{N-1} x^*(k)x(k+m) \quad (1)$$

$$x(k) = s(k) + I(k) \quad (2)$$

Since autocorrelation depends on time-distance between a pair of values, autocorrelation can be expressed as a function of the time-lag. Autocorrelation at lag 0, R(0) is sum of autocorrelation of the FM signal $R_S(0)$ and autocorrelation of the spur $R_I(0)$ as given in equation (3).

$$R(0) = RS(0) + RI(0) \quad (3)$$

The equation (3) provides the first auto-correlated signal (R(0)).

At step 410, a second auto-correlation of the signal is performed at a high lag by the spur detector 150.

Autocorrelation at a very high lag, n, R(n) is sum of autocorrelation of the FM signal $R_S(n)$ and autocorrelation of the spur $R_I(n)$ as given in equation (4). Value of n is chosen to be greater than half bandwidth of the signal. In one example, value of n is 60 when the signal is sampled at 384 KHz.

$$R(n) = RS(n) + RI(n) \quad (4)$$

The equation (4) provides the second auto-correlated signal (R(n)).

At step 415, a second energy of the signal is determined R(0) and R(n) are calculated. $R_S(n)$ is lesser than $R_S(0)$ since magnitude of the autocorrelation of the FM signal is very less at a high value of lag. However, $R_I(n)$ is approximately equal to $R_I(0)$. Hence, the term |R(0)|−|R(n)| is an estimate of power of the FM signal without power of the spur. The spur detector 150 estimates the second energy of the FM signal using equation (5).

$$\text{Energy of the FM signal} = 10 \log_{10}(|R(0)|-|R(n)|) \quad (5)$$

At step 420, a check is performed to determine if the second energy estimated using equation (5) is greater than the third threshold. If the second energy estimated using equation (5) is greater the third threshold, then step 425 is performed else the process is terminated. In one example, the third threshold is selected as 0 (decibel microvolt) dBμV. False lock is prevented when the spur is lesser than 0 dBμV.

At step 425, the presence of the desired signal is identified.

In some embodiments, the spur detector 150 may estimate the second energy according to equation (6).

$$\text{Energy of the FM signal} = \quad (6)$$
$$10 \log_{10}(|R(0)|-|R(n)|) + \alpha \log_{10}\left(\frac{|R(0)|-|R(n)|}{|R(0)|}\right)$$

In equation (6), $$\alpha \log_{10}\left(\frac{|R(0)|-|R(n)|}{|R(0)|}\right)$$

is a programmable value, herein referred to as the correction factor. The correction factor optimizes computation of the second energy of the FM signal. In one embodiment, the value of α is selected based on simulation results. With this estimated second energy, the system 100 prevents false lock when the spur is upto 25 dB stronger than the third threshold.

Figure 5A:
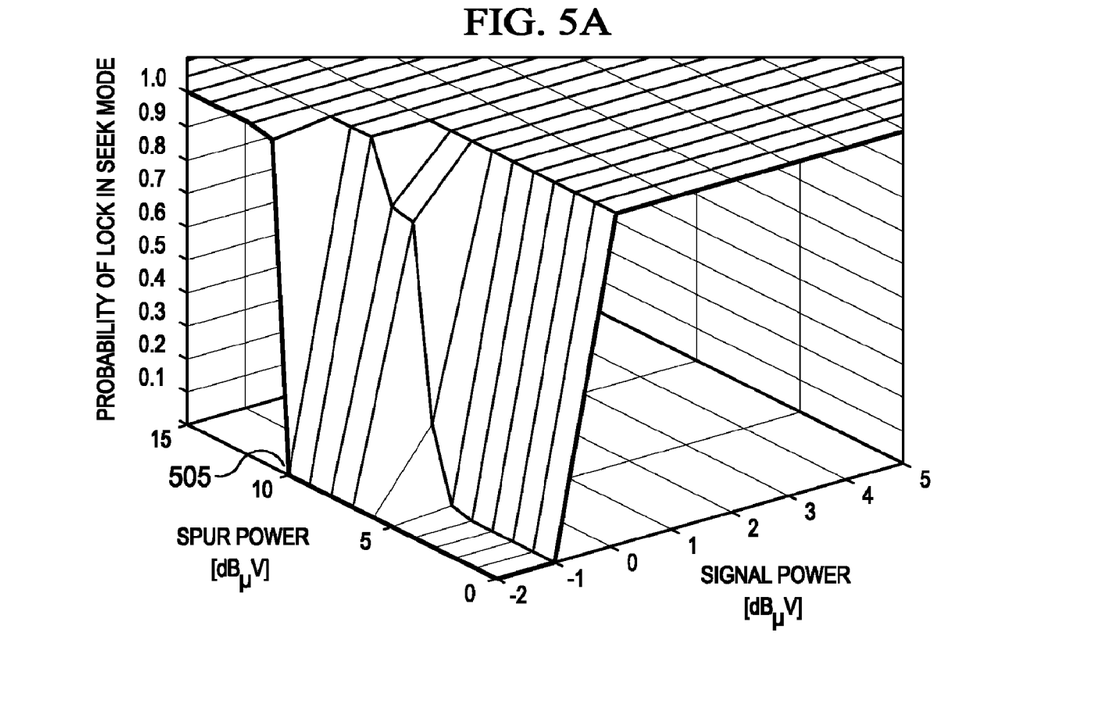
FIG. 5A, FIG. 5B, and FIG. 5C illustrate exemplary results of spur detection in accordance with one embodiment.

FIG. 5A exemplarily illustrates performance of the spur detector 150, using equation (5). The performance is indicated as a two-dimensional (2-D) representation of probability of lock in autonomous scan where X-axis represents FM signal power and Y-axis represents spur power. The third threshold is selected as 0 dBμV. When the spur is upto 10 dB 505 above the third threshold, probability of false locks is low.

Figure 5B:
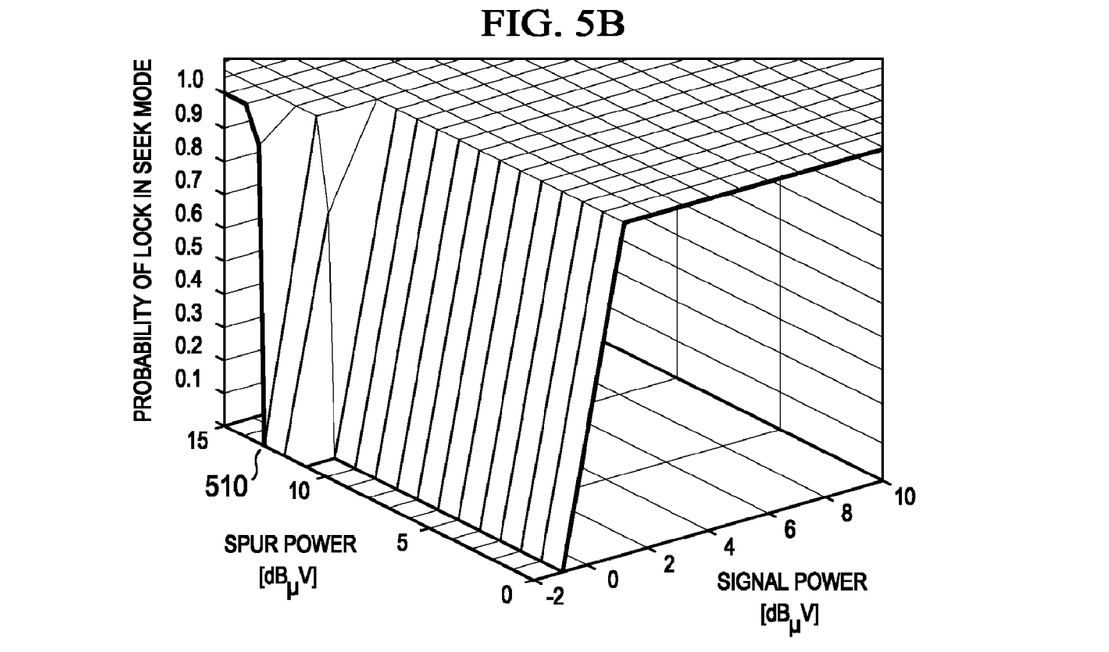

FIG. 5B exemplarily illustrates performance of the spur detector 150, using equation (6). The performance is indicated as a 2-D representation of probability of lock in autonomous scan where X-axis represents FM signal power and Y-axis represents spur power. The third threshold is selected as 0 dBμV. When the spur power is upto 12 dB 510 above the third threshold, the system 100 avoids false lock.

Figure 5C:
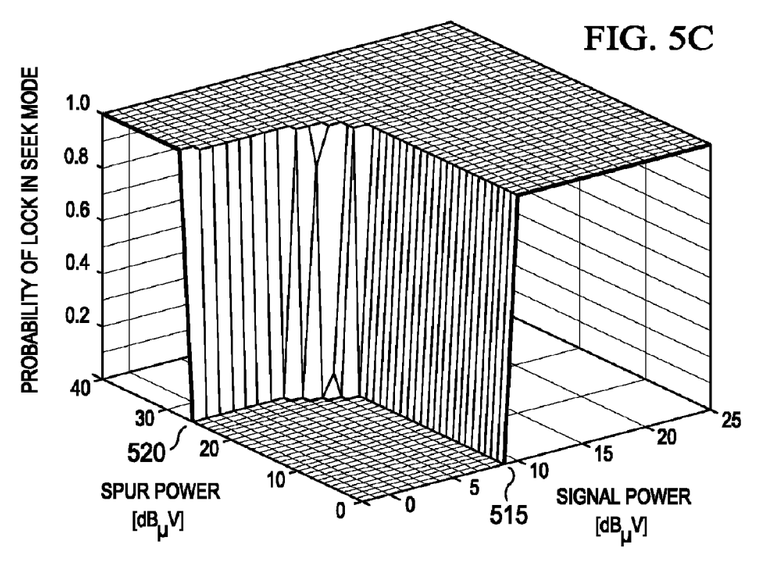

FIG. 5C exemplarily illustrates performance of the spur detector 150, using equation (5). The performance is indicated as a 2-D representation of probability of lock in autonomous scan where X-axis represents FM signal power and Y-axis represents spur power. The third threshold is selected as 10 dBμV. When the spur power is below 27 dBμV 520, the system 100 avoids false lock. When the FM signal power is greater than 10 dBμV 515, the system 100 declares a lock, as desired, irrespective of the spur power level.

Figure 6:
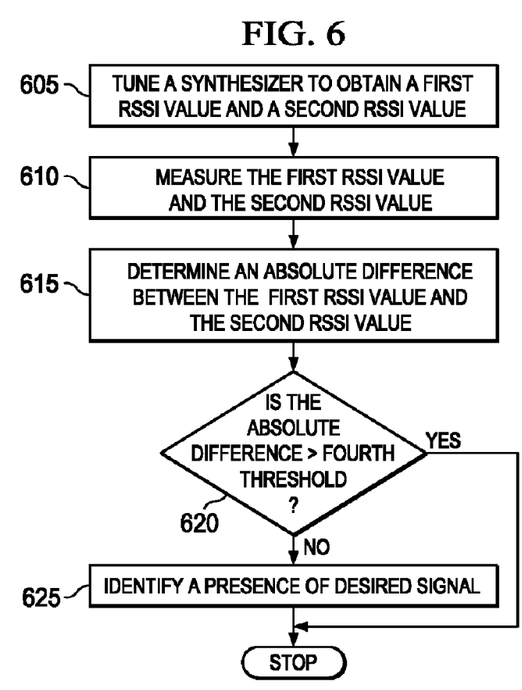
FIG. 6 illustrates a method for compression detection in an FM channel in accordance with one embodiment.

FIG. 6 illustrates a method for compression detection in an FM channel. The compression detector 165 can tune the synthesizer 156 in the FM receiver to supply oscillator signals to mixers in the FM receiver. The compression detector 165 can identify undesired harmonic components in the signal generated due to compression detection. The synthesizer is tuned to enable comparison of RSSI at two different frequencies for compression detection.

In one example, consider the FM channel to be centered at $f_c$.

At step 605, the synthesizer 156 is tuned to obtain a first RSSI value and a second RSSI value. The synthesizer may be an oscillator. The signal is down converted to IF by using the oscillator signal of frequency $f_{LO}=f_c+f_{IF}$ or $f_{LO}=f_c-f_{IF}$ supplied to the mixers, where $f_{IF}$ is the IF. Any valid FM channel centered at a frequency out of bandwidth 200 KHz occupied by the received FM channel is herein referred to as a blocker. Consider a blocker centered at frequency $f_c+200$ KHz. Also, let the oscillator signal be of frequency $f_c+150$ KHz or $f_c-150$ KHz, i.e., IF=150 KHz. When the signal is down converted to the IF with the oscillator signal of frequency $f_c$+150 KHz, third harmonic of the blocker falls into the bandwidth of the received FM channel, for example the channel at $f_c$. The third harmonic can cause a false frequency lock. However, when the signal is down converted to the IF with the oscillator signal of frequency $f_c$−150 KHz, third harmonic of the blocker falls out of the bandwidth of the received FM channel.

At step 610, the first RSSI value and the second RSSI value are measured. The RSSI computation unit 155 is used to measure signal strength in the received FM channel with the oscillator at frequency $f_c$−150 KHz and at $f_c$+150 KHz. A $RSSI_{LO}$ (the first RSSI value) is at $f_c$−150 KHz and a $RSSI_{HI}$ (the second RSSI value) is at $f_c$+150 KHz, to prevent the false frequency lock. The signal strength in the received FM channel corresponding to oscillator at frequency $f_c$−150 KHz is herein referred to as $RSSI_{LO}$. The signal strength in the received FM channel corresponding to oscillator at frequency $f_c$+150 KHz is herein referred to as $RSSI_{HI}$.

At step 615, an absolute difference between the first RSSI value and the second RSSI value is determined.

At step 620, a check is performed by the system 100 to determine if an absolute value of the difference between $RSSI_{LO}$ and $RSSI_{HI}$ is greater than the fourth threshold. The difference is obtained by the compression detector 165. When the absolute value of the difference between $RSSI_{LO}$ and $RSSI_{HI}$ is greater than the fourth threshold, compression is detected. If the absolute value of the difference between $RSSI_{LO}$ and $RSSI_{HI}$ is greater than the fourth threshold then the process is stopped, else step 620 is performed.

At step 625, the presence of the desired signal is identified.

Figure 7:
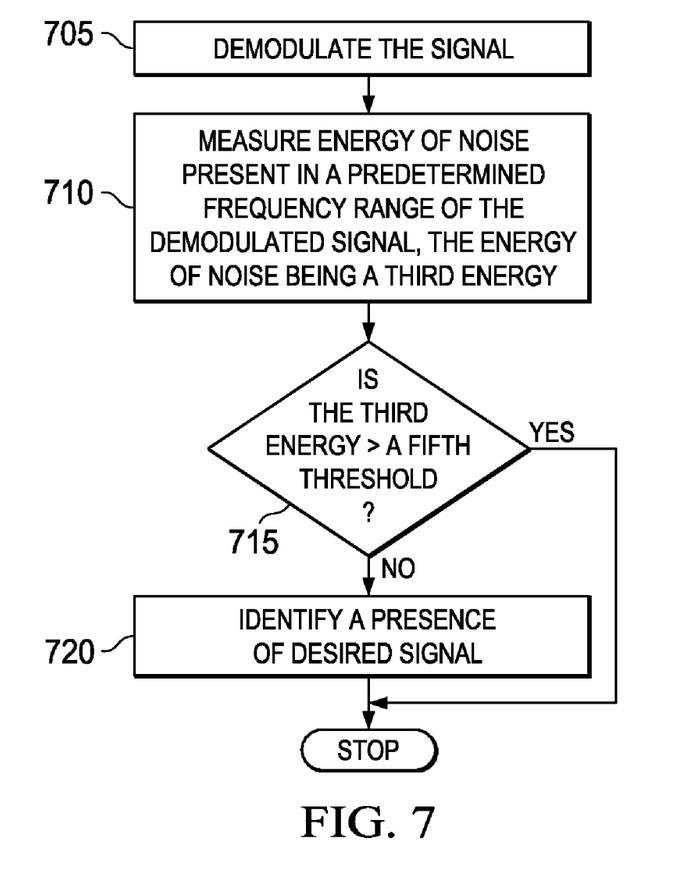
FIG. 7 illustrates a method for measuring energy of noise in accordance with one embodiment.

FIG. 7 illustrates a method for measuring noise in the FM MPX signal at the FM receiver. Consider an FM channel to be centered at frequency fc. Also, consider two blockers of approximately equal signal strengths centered at frequencies fc+100 KHz and fc−100 KHz. This scenario is herein referred to as double blocker scenario. The blockers can cause a false lock if sum of their energies is greater than the RSSI threshold. The blockers can also cause a false lock since the IF count would be close to zero.

At step 705, a signal is demodulated.

At step 710, energy of noise present in a predetermined frequency range of the demodulated signal is measured by the noise detector 170. The noise detector 170 measures the energy of noise in a frequency range of 15 KHz to 23 KHz of the FM MPX signal. The transmitted FM MPX signal does not contain any component in the frequency range of 15 KHz to 23 KHz, except the pilot signal at 19 KHz. Hence, the level of noise measured in the range 15 KHz to 23 KHz can indicate the presence of the desired signal. The third energy may be the energy of noise of the signal.

At step 715, a check is performed by the system 100 to determine if the third energy is greater than the fifth threshold. If the third energy is greater than the fifth threshold then the process is stopped, else step 720 is performed.

At step 720, the presence of the desired signal is identified.

The noise detector 170 helps avoid false lock due to the double blocker scenario. The noise detector 170 also avoids false frequency lock due to wide-band interference at input of the FM receiver.

In one embodiment, the noise detector 170 includes a band pass filter centered at 19 KHz to select a band of frequencies around the pilot signal at 19 KHz or a signal at 19 KHz generated in the system 100. The noise detector 170 also includes a noise measurement unit coupled to the band pass filter to measure noise strength in the band of frequencies.

In another embodiment, the noise detector 170 involves mixing and filtering operations to measure the third energy in the band of frequencies. Further, the noise detector 170 is explained in conjunction with FIG. 8.

Figure 8:
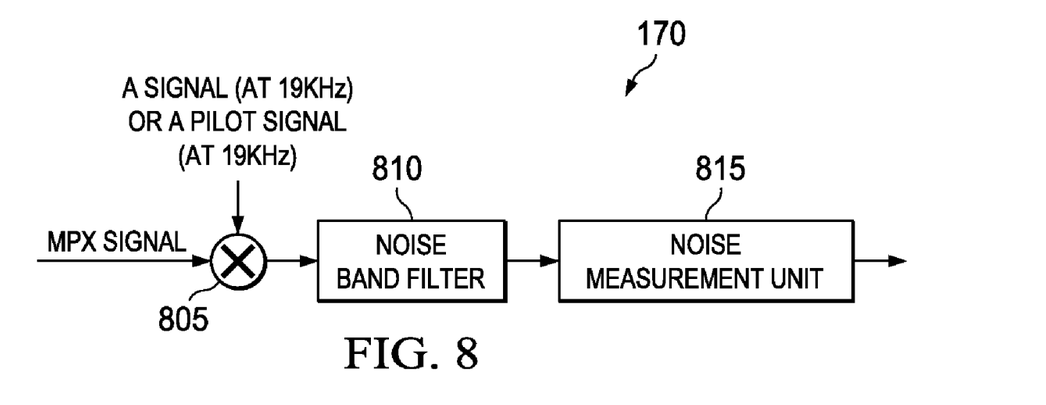
FIG. 8 illustrates a block diagram of a noise detector in accordance with one embodiment.

FIG. 8 illustrates block diagram of the noise detector 170. The noise detector 170 includes a signal multiplier or a mixer 805 operable to multiply the FM MPX signal and a signal. For example, the mixer 805 is operable to multiply the FM MPX signal and a signal having a predetermined frequency. The signal may be a pilot signal or a signal having a predetermined frequency of 19 KHz. The FM MPX signal is frequency translated such that if a pilot signal is present at 19 KHz, the pilot signal is down converted to DC (0 Hz). In one embodiment, the mixer 805 multiplies the FM MPX signal and the signal at 19 KHz generated in the system 100. In another embodiment, in the presence of the pilot signal at 19 KHz, the mixer 805 multiplies the FM MPX signal and an output signal generated by a phase locked loop for pilot signal recovery.

The noise detector 170 includes a noise band filter 810 coupled to the mixer 805 to remove the pilot signal, the RDS component and the mono and stereo components. The noise band filter 810 comprises a plurality of filters. An example of the plurality of filters may include, but not limited to, a plurality of decimation filters and a FIR filter. In one embodiment, the noise band filter 810 includes a low pass filter and a high pass filter. The noise detector 170 also includes a noise measurement unit 815 coupled to the noise band filter 810. Examples of the noise measurement unit 815 include, but are not limited to, an energy accumulator, a mean absolute value computation block, and an envelope detector. The noise measurement unit 815 measures the third energy of the noise of the FM MPX signal in a frequency range of 15 KHz to 23 KHz or other unused bands above 60 KHz.

The third energy of noise can be compared with the fifth threshold to determine if a lock has to be declared. If the third energy of noise in the FM MPX signal is below the fifth threshold then lock is declared.

In the foregoing discussion, the term "coupled" refers to either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

Those skilled in the art will recognize that a wide variety of modifications, alterations, and combinations can be made with respect to the above described embodiments without departing from the scope of the present disclosure, and that such modifications, alterations, and combinations are to be viewed as being within the ambit of the present disclosure.

What is claimed is:

1. A method for identifying a presence of a desired signal to avoid false frequency lock in a Frequency Modulation (FM) receiver, the method comprising:
   receiving a signal;
   determining a first energy of the signal, the first energy being the strength of the signal;
   identifying the presence of the desired signal, if the first energy is above a first threshold;
   determining an Intermediate Frequency (IF) count of the signal;
   identifying the presence of the desired signal, if the IF count is below a second threshold;
   determining a second energy;
   identifying the presence of the desired signal, if the second energy of the signal is above a third threshold;

identifying the presence of the desired signal, if an absolute difference between a first Received Signal Strength Indication (RSSI) value and a second RSSI value of the signal is below a fourth threshold;
determining a third energy, the third energy being an energy of noise in the signal; and
identifying the presence of the desired signal, if the third energy is below a fifth threshold.

2. The method as claimed in claim 1, wherein determining the second energy of the signal comprises:
performing a first auto-correlation of the signal at a zero lag to obtain a first auto-correlated signal;
performing a second auto-correlation of the signal at a high lag to obtain an absolute value of a second auto-correlated signal; and
determining a difference between the first auto-correlated signal and the absolute value of the second auto-correlated signal to obtain a spur-free power of the signal.

3. The method as claimed in claim 1, wherein determining the second energy of the signal comprises:
performing a first auto-correlation of the signal at a zero lag to obtain a first auto-correlated signal;
performing a second auto-correlation of the signal at a high lag to obtain an absolute value of a second auto-correlated signal;
determining a difference between the first auto-correlated signal and the absolute value of the second auto-correlated signal;
determining a correction factor based on the first auto-correlated signal and the absolute value of the second auto-correlated signal; and
summing the difference and the correction factor to obtain a spur-free power of the signal.

4. The method as claimed in claim 1, wherein the first RSSI value of the signal is determined by:
down converting the signal to an Intermediate Frequency (IF) signal by performing mixing operation of the signal and a second signal at a first frequency different from center frequency of the signal; and
measuring RSSI of the IF signal.

5. The method as claimed in claim 1, wherein the second RSSI value of the signal is determined by:
down converting the signal to an Intermediate Frequency (IF) signal by performing mixing operation of the signal and a third signal at a second frequency different from center frequency of the signal; and
measuring RSSI of the IF signal.

6. The method as claimed in claim 1, wherein identifying the presence of the desired signal based on the absolute difference comprises:
identifying undesired harmonic components generated due to compression of the signal in a front end of the FM receiver.

7. The method as claimed in claim 1, wherein determining the third energy of the noise present in the signal comprises:
demodulating the signal; and
measuring energy of the noise present in a predetermined frequency range of the demodulated signal.

8. The method as claimed in claim 7, wherein the predetermined frequency range of the demodulated signal comprises noise and a pilot component of the signal.

9. A system for identifying the presence of a desired signal to avoid false frequency lock in a Frequency Modulation (FM) receiver, the system comprising:
a Received Signal Strength Indication (RSSI) computation unit to identify the presence of the desired signal, if a first energy of a signal, received by the FM receiver, is above a first threshold;
an Intermediate Frequency (IF) count unit to identify the presence of the desired signal, if the IF count of the signal is below a second threshold;
a spur detector to identify the presence of the desired signal, if a second energy of the signal is above a third threshold;
a compression detector to identify the presence of the desired signal, if an absolute difference between a first RSSI value and a second RSSI value of the signal is below a fourth threshold; and
a noise detector to identify the presence of the desired signal, if a third energy of noise in the demodulated signal is below a fifth threshold.

10. The system as claimed in claim 9, wherein the spur detector comprises:
an auto-correlator to perform an auto-correlation of the signal.

11. The system as claimed in claim 9, wherein the compression detector tunes a synthesizer to two different frequencies to obtain the first RSSI value and the second RSSI value of the signal.

12. The system as claimed in claim 9, wherein the RSSI computation unit generates the first RSSI value and the second RSSI value of the signal.

13. The system as claimed in claim 9, wherein the noise detector comprises:
a signal multiplier operable to multiply a demodulated FM signal and another signal,
wherein the another signal is at least one of: a predetermined frequency, and a demodulated pilot signal;
a noise band filter coupled to the signal multiplier; and
a noise measurement unit coupled to the noise band filter.

14. The system of claim 13, wherein the noise band filter comprises:
a plurality of filters coupled to the signal multiplier.

15. The system of claim 13, wherein the noise measurement unit is at least one of:
an energy accumulator;
a mean absolute value computation unit; and
an envelope detector.

16. The system of claim 9, wherein the noise detector comprises:
a band pass filter; and
a noise measurement unit coupled to the band pass filter.

17. A system for identifying the presence of a desired signal to avoid false frequency lock in a Frequency Modulation (FM) receiver, the system comprising:
a Received Signal Strength Indication (RSSI) computation unit to identify the presence of the desired signal, if a first energy of a signal received by the FM receiver, is above a first threshold;
an Intermediate Frequency (IF) count unit to identify the presence of the desired signal, if the IF count of the signal is below a second threshold;
a spur detector to identify a spur-free signal, if a second energy of a signal is above a third threshold, wherein the spur detector comprises an auto-correlator to perform an auto-correlation of the signal to determine the second energy of the signal;
a compression detector to determine undesired harmonic components in the signal and identify the presence of the desired signal, if an absolute difference between a first Received Signal Strength Indication (RSSI) value and a second RSSI value of the signal is below a fourth threshold; and a noise detector to identify a noise-free FM signal, if a third energy of noise in the signal is below a fifth threshold, wherein the noise detector comprises:

a signal multiplier operable to multiply demodulated signal and a signal;

a noise band filter coupled to the signal multiplier; and a noise measurement unit coupled to the noise band filter, the noise measurement unit measures the third energy of the noise of the demodulated signal in a frequency range of: 15 KHz to 23 KHz.

18. The system as claimed in claim 17, wherein the noise band filter comprises:

a plurality of filters coupled to the signal multiplier.

19. The system of claim 17, wherein the noise measurement unit is at least one of:

an energy accumulator;

a mean absolute value computation unit; and an envelope detector.

20. The system of claim 17, wherein the compression detector tunes the synthesizer to two different frequencies to obtain the first RSSI value and the second RSSI value from a RSSI computation unit.

* * * * *